(12) United States Patent
Falzon

(10) Patent No.: US 6,795,218 B1
(45) Date of Patent: Sep. 21, 2004

(54) SYSTEM FOR REGULATING THE BIT RATE OR QUALITY OF A DIGITAL DATA COMPRESSOR, IN PARTICULAR AN IMAGE COMPRESSOR

(75) Inventor: Frédéric Falzon, Nice (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/527,594

(22) Filed: Mar. 17, 2000

(30) Foreign Application Priority Data

Mar. 18, 1999 (FR) .......................................... 99 03371

(51) Int. Cl.[7] ................................................. H04N 1/64
(52) U.S. Cl. ................... 358/448; 358/435; 358/261.2; 382/168; 382/232
(58) Field of Search ........................... 358/448, 261.2, 358/435, 522, 539; 382/168, 232, 251, 250

(56) References Cited

U.S. PATENT DOCUMENTS

| | | | |
|---|---|---|---|
| 5,134,476 A | | 7/1992 | Aravind et al. ............. 358/133 |
| 5,246,053 A | * | 9/1993 | Jain ............................ 358/209 |
| 5,249,053 A | * | 9/1993 | Jain ............................ 358/209 |
| 5,598,213 A | * | 1/1997 | Chung ......................... 348/405 |
| 5,745,179 A | | 4/1998 | Senda ......................... 348/409 |
| 6,154,493 A | * | 11/2000 | Acharaya et al. ......... 375/240.1 |
| 6,310,962 B1 | * | 10/2001 | Chung et al. ................ 382/100 |

FOREIGN PATENT DOCUMENTS

| | | | |
|---|---|---|---|
| EP | 0 239 076 A2 | 9/1987 | .......... H04N/7/133 |
| EP | 0 478 230 A2 | 4/1992 | |
| EP | 0 514 663 A2 | 11/1992 | .......... H04N/7/133 |
| EP | 0 540 961 A2 | 5/1993 | ............ H04N/7/13 |
| EP | 0 631 443 A1 | 12/1994 | ............ H04N/1/40 |
| EP | 684 738 A2 | 11/1995 | ............ H04N/7/50 |
| EP | 0 741 497 A1 | 11/1996 | |

* cited by examiner

Primary Examiner—Kimberly Williams
Assistant Examiner—Negussie Worku
(74) Attorney, Agent, or Firm—Sughrue Mion, PLLC

(57) ABSTRACT

A processing system for transmitting digital data, in particular image data, in a transmission channel includes a system for compressing the data, made up of a decorrelator, a quantizer and a coder, and a regulation system receiving as input decorrelated data from the decorrelator and a set point and supplying a quantizing parameter to the quantizer.

18 Claims, 2 Drawing Sheets

SYSTEM FOR REGULATING THE BIT RATE OR QUALITY OF A DIGITAL DATA COMPRESSOR, IN PARTICULAR AN IMAGE COMPRESSOR

BACKGROUND OF THE INVENTION

1. Field of the Invention

The present invention relates to a system for compressing data which is located between a sensor and a transmission unit. The invention applies particularly well to remote sensing satellites which acquire image data and then transmit it to a ground station via a radio transmission channel one characteristic of which is that it is able to convey information only at a constant bit rate.

2. Description of the Prior Art

The volume of information acquired by the sensor is generally greater than the volume of information that the transmission channel can transmit. This is true in particular for remote sensing satellites because of the increased number and resolution of onboard sensors. Consequently, it is necessary to employ data compression processes to reduce the quantity of information to be transmitted for the same volume of information acquired by the sensor.

However, because of the inherent nature of the compression processes, the output bit rate of the compressor is directly proportional to the entropy of the input signal. The quantity of information to be transmitted therefore generally varies with time because the characteristics of the input signal themselves vary with time.

To optimize the use of the transmission channel it is therefore necessary to minimize these bit rate fluctuations at the output of the compression system by regulating the bit rate.

In the situation where the transmission channel requires a constant bit rate, this regulation becomes essential.

FIG. 1 is an extremely schematic representation of the architecture of a signal processing system in the context of the invention. This architecture takes the form of a processing system comprising a chain of processing units.

The unit 1 is a sensor. It can be an optical or infrared video camera on board a remote sensing satellite, for example.

The unit 2 is a compressor.

The unit 3 is a bit rate regulator.

The unit 4 is a backing store which serves as a cache memory for the transmission unit 5. In the case of a remote sensing satellite, the transmission channel is not always available, in particular because of the time limit on the line of sight between the satellite and the ground stations. It must therefore be possible to store data during these periods in which the transmission channel is not available.

The flow of data can pass through the backing store 4 or not, depending on the availability of the transmission channel.

FIG. 2 is a schematic representation of a first embodiment of the regulator.

A buffer $B_1$ is inserted between the compressor $C_1$ and the backing store $M_1$. A regulator $R_1$ detects when the buffer $B_1$ is full and then interrupts the acquisition of data.

To comply with the constraint of a constant bit rate on the transmission channel, non-significant data is transmitted when the buffer $B_1$ is empty.

Because non-significant data is transmitted, the bit rate on the transmission channel is not the optimum bit rate. This solution is therefore unsatisfactory.

A second solution is disclosed in French patent 2 707 070, whose title in translation is Variable bit rate compression image processing system. The patentee is the Centre National d'Études Spatiales (CNES). FIG. 3 is a schematic representation of the system.

As in the previous solution, a buffer memory $B_2$ is inserted between the compressor $C_2$ and the backing store $M_2$. A regulator $R_2$ knows the filling level $L_B$ of the buffer memory $B_2$ and an estimate E of the quantity of information contained in the data before compression, or more precisely of the complexity of that data expressed as the sum of the absolute value of the finite differences of the image along its lines. On the basis of these two parameters and a regulation law f, the regulator $R_2$ determines a compression ratio t from the equation $t=f(E, L_B)$.

According to this solution, if the quantity of information measured by the estimator E is high during a particular time period (in which case the level $L_B$ is also high), the compression rate t is increased to prevent saturation of the buffer $B_2$.

This solution has many drawbacks:

In practice the quality of the prediction of the compression rate supplied by the estimation E is not constant in the image and can vary considerably. This therefore leads to an equally large variability of the quality of regulation, which must then be compensated by a system (referred to as a skew correction system in this prior art solution) for correcting the prediction error a posteriori. If that system is not used, then the buffer may need to be large, which can increase the complexity of the hardware and the cost, in particular for onboard systems.

It employs a large number of parameters (Par) in the form of a network of prediction straight line segments whose number is proportional to the number of bits on which the input data is coded. Each straight line segment is characterized by the two parameters of an equation. All these parameters are determined empirically, i.e. by carrying out a large number of measurements of the bit rate and complexity as a function of the quantizing step, and finally by applying linear regression to the clouds of points obtained. This method is therefore relatively cumbersome and can be inaccurate, in particular due to the obligation to limit the number of straight line segments obtained, which amounts to limiting the number of quantizing steps that are possible for the regulation function.

Finally, from a practical point of view the method may be difficult to implement in the situation where the bit rate of the input data is high. The computations performed in the regulation loop, in particular the computation of the quantizing step, cannot be performed by an ASIC. A microprocessor is therefore needed. Microprocessors have clock frequencies which are significantly lower than that of an ASIC, which severely limits this type of regulation.

The object of the invention is therefore to alleviate the various drawbacks of the prior art.

SUMMARY OF THE INVENTION

To this end, the present invention firstly provides a processor for transmitting digital data, in particular image data, in a transmission channel, the system including:

a compression system for compressing the data including a decorrelation system, a quantizing system and a coding system, and a regulation system supplying to the quantizing system at least one quantizing parameter, the regulation system receiving as input decorrelated data from the decorrelation system and a set point.

The system can further include a storage system at the output of the compression system.

The invention also provides a processing method for transmitting digital data, in particular image data, in a transmission channel, the method including the following ordered steps:

decorrelating the data, computing a quantizing parameter from a set point and the decorrelated data, quantizing the decorrelated data in accordance with the quantizing parameter, and coding the data quantized in the preceding step.

The method can further include a step of storing data at the output of the coding step in a storage system.

In one particular embodiment of the invention the quantizing parameter further depends on measured information from the storage means.

In various embodiments the set point can be a set point bit rate or a set point quality.

Other features of the invention will become clear in the light of the following description of various embodiments of the invention, given with reference to the accompanying drawings.

DETAILED DESCRIPTION OF THE PREFERRED EMBODIMENT

1) Compressor C

Figure 1:
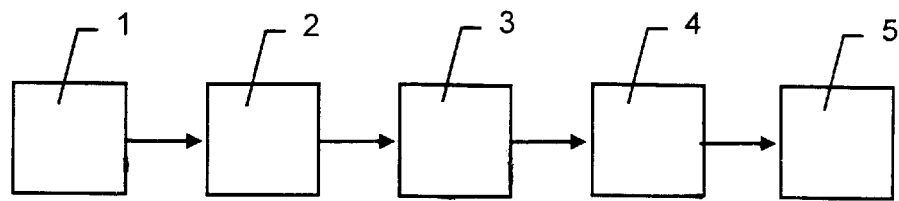
FIG. 1 is a schematic representation of an image compression system used conventionally in the context of the invention.
Figure 2:
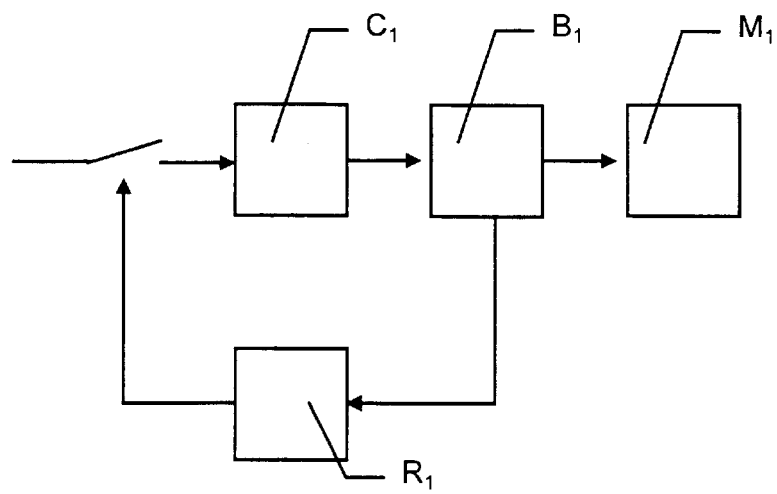
FIGS. 2 and 3 show prior art solutions.
Figure 3:
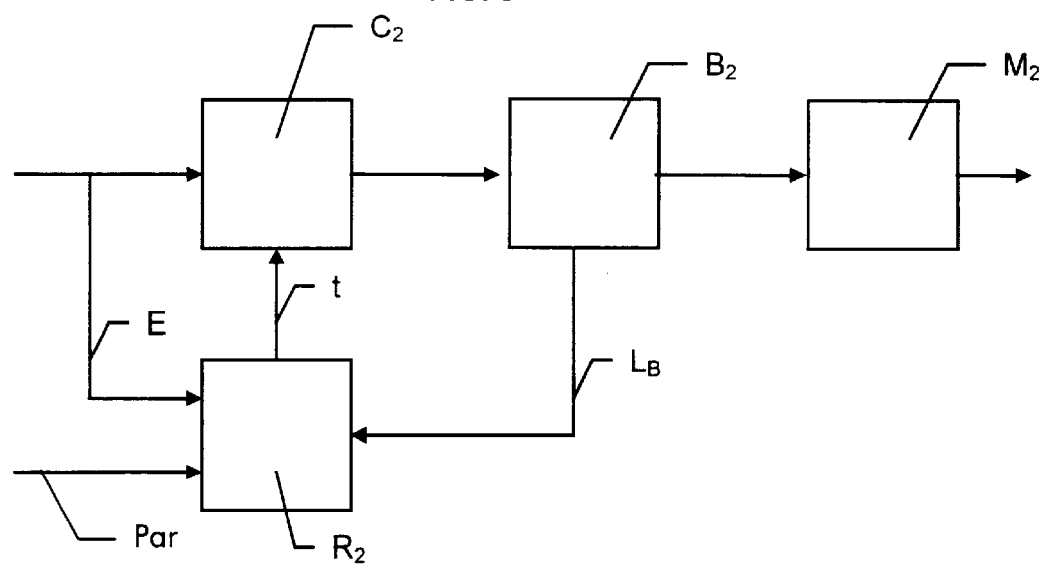
Figure 4:
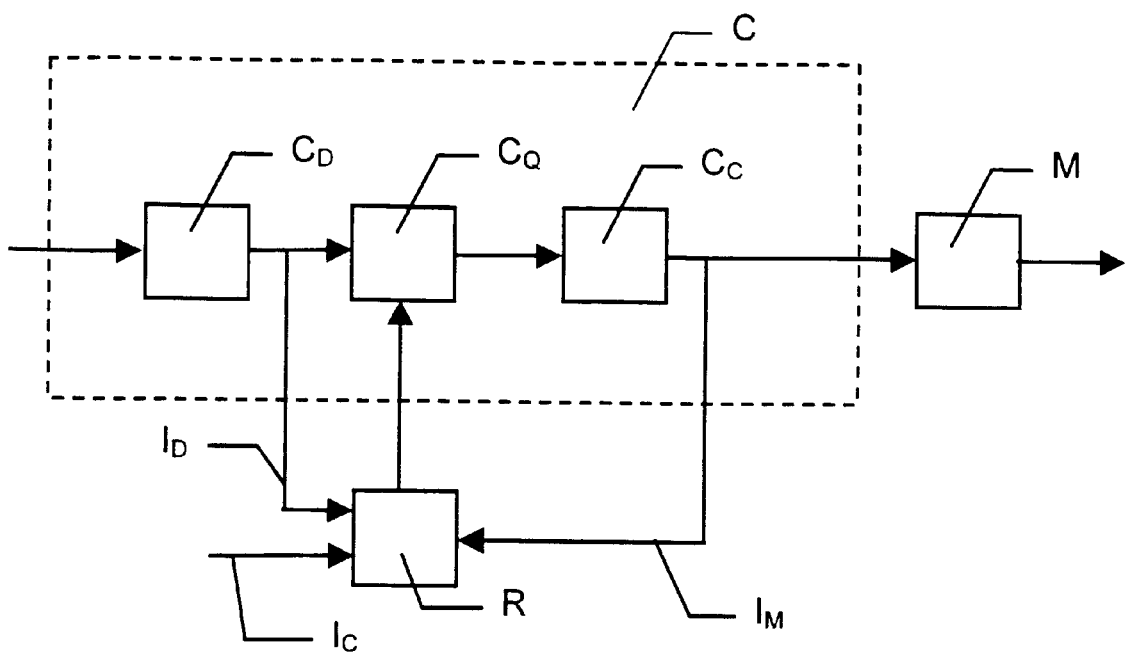
FIG. 4 shows the system according to the invention.

The compressor C used by the system according to the invention is of the type commonly referred to as a transform coding compressor. A compressor of this kind is conventionally divided into three modules: a decorrelation module ($C_D$), a quantizing module ($C_Q$) and a coding module ($C_C$).

The function of the decorrelation module $C_D$ can be seen as formatting data so that it is processed with maximum efficiency by the quantizing module $C_Q$. In the case of a compression system conforming to the recommendations of the JPEG (Joint Photographic Expert Group), the data is decorrelated by a Discrete Cosine Transform (DCT).

Other mathematical transforms can be used, in particular the wavelet transform, which often offers better performance.

The function of the quantizing module $C_Q$ is to reduce the amount of information to be transmitted by quantizing the decorrelated signal. After this operation, which reduces the alphabet with which the signal is described, the coding module $C_C$ codes the quantized values by assigning a code of variable length which is a function of the probability of the various symbols of the alphabet occurring. One example of a method for effecting this coding is Huffman coding as described in the article "A method for the construction of minimum redundancy codes" by D. A. Huffman published in "Proceedings of the Institute of Electronics and Radio Engineers" in 1952.

2) Decorrelated Data $I_D$

The decorrelated data (or coefficients) $I_D$ from the decorrelation system ($C_D$) is processed area by area. If the system implementing the system according to the invention is a remote sensing satellite, the input data forms a digital image with a width of a few thousand pixels and a theoretically infinite length, since the sensor is acquiring data all the time. Consequently, the flow of data from the sensor is divided into areas and regulation is effected in each of these areas.

The division of the decorrelated data $I_D$ into areas depends on the nature of the decorrelation process. Thus in the case where the decorrelation system $C_D$ is based on a wavelet transform, the areas are preferably strips of the image. If the decorrelation system uses a cosine transform, the areas are preferably lines of blocks.

Note, nevertheless, that in the case of regulating quality, the invention can also be applied to the situation of small images in which the whole of the information can be stored in memory. In this case, the image can be considered to comprise only one area, on which the subsequent processing is effected.

3) Storage System M

Given that the regulation system R uses a model of the behavior of the compression system C, there is a slight variation in the bit rate at the output of the regulated system.

In the case of a remote sensing system on board a satellite, the transmission channel is a constant bit rate channel. The slightly variable bit rate has to be converted to a constant bit rate by means of a memory M which has an integrator function.

It is important to note that this memory is optional in the sense that the invention can be applied to systems which are not subject to this constraint on the transmission channel. What is more, the quality of the regulation in accordance with the invention makes the variability of the bit rate at the output of the compression system C very slight compared to the prior art solutions. For example, the ratio of the variabilities between the solution according to the invention and the solution described in French patent 2 707 070 can be greater than 100, depending on the nature of the image areas in which it is computed.

What is more, even if the memory M is indispensable in order to obtain zero variability at the output of the system, it can be much smaller because of the low variability of the input bit rate. This reduction can be crucial, in particular in the case of an onboard system.

Because of the prediction quality of the model used, the maximum size of the memory for a fixed output bit rate can also be calculated a priori and theoretically.

4) Bit Rate Regulation

The system according to the invention can be used either to regulate the bit rate or to regulate quality. In the former case, the set point information $I_C$ is a set point bit rate, hereinafter denoted $R_c$.

The objective of the regulation system R is then to supply to the quantizing system $C_Q$ a quantizing parameter PQ as a function of the set point bit rate $R_c$ and information $I_D$ from the decorrelation system $C_D$. The quantizing parameter can be recomputed for each area of coefficients.

For each area of coefficients $I_D$ from the decorrelation system $C_D$, the regulation system can carry out a sorting process by ordering the coefficients in decreasing order of absolute amplitude. For example, the coefficients can be stored and sorted in a table $I_D[i]$, with i varying from 1 to the cardinal number of the area, the cardinal number of the area being the number of coefficients that it contains.

Another approach, which has the advantage of reducing the computation time and therefore of improving the implementation of the invention, is to dispense with the need for sorting by constructing a histogram of the modulus of the coefficients and computing the quantizing step related to the required bit rate using an algorithm explained later. This has the great advantage of requiring no microprocessor and of being implementable in ASIC form.

4.1) Open Loop Bit Rate Regulation

In one particular embodiment of the invention the quantizing parameter PQ is a quantizing step determined by the following expression:

$$PQ = \alpha \cdot |I_D(\beta \cdot R_C)|$$

in which $\alpha$ and $\beta$ are two parameters which are preferably within the following ranges: $\alpha \in [1;2]$ and $$\beta \in \left[\frac{1}{10}; \frac{1}{3}\right].$$

$|I_D(\beta \cdot R_c)|$ is the modulus of the sorted coefficient of index $\beta \cdot R_c$.

A practical embodiment consists in storing the moduli of the sorted coefficients in a one-dimensional table from which the element corresponding to the index $\beta \cdot R_c$ is taken.

As previously indicated, another approach is to construct the histogram H of the moduli of the coefficients $I_{D_{min}} \leq I_D \leq I_{D_{min}}$, and PQ related to the bit rate $R_C$ is obtained as soon as $$\sum_{i=\frac{PQ}{\alpha}}^{I_{D_{max}}} H(i)$$

becomes equal to $\lfloor R_c \cdot \beta \rfloor$ i.e. to the integer part of the product $\beta \cdot R_c$.

The values of the parameters $\alpha$ and $\beta$ depend on the decorrelation process used by the decorrelation system $C_D$. These values are preferably chosen from the following table:

|  | $\alpha$ | $\beta$ |
|---|---|---|
| Cosine transform | 2 | $\frac{1}{5.5}$ |
| Wavelet transform | 1 | $\frac{1}{6.5}$ |

Note, however, that the above values are given only for one particular, although preferred, embodiment of the invention. It is obvious that the invention can be extended to other types of decorrelation process. For each new decorrelation process it is merely necessary to determine a new pair of parameters a, D whose optimum values can be determined experimentally.

4.2) Closed Loop Bit Rate Regulation

In another embodiment of the invention the regulation system R also receives measured information $I_M$ from the storage system M. This information is used to correct the model by taking account of the degree to which the memory M is full. Thus if the memory is too full, the compression rate can be increased by modifying the quantizing parameter PQ. Conversely, if the memory is too empty, the compression rate can be reduced.

To be more precise, the information $I_M$ can measure the difference between the degree of filling of the memory M and a nominal degree of filling (for example 50%). In one particular embodiment the quantizing parameter PQ is a quantizing step determined by the expression $$PQ = \alpha \cdot \left|I_D\left(\beta \cdot \left(R_C + \frac{I_M}{k \cdot Z}\right)\right)\right|$$

in which $\alpha$ and $\beta$ are two parameters which are preferably in the following ranges: $\alpha \in [1;2]$ and $$\beta \in \left[\frac{1}{10}; \frac{1}{3}\right].$$

The parameter k is a damping factor and Z is the cardinal number of the area of coefficients. In the same way as previously, the values of the parameters $\alpha$ and $\beta$ depend on the decorrelation process used by the decorrelation system $C_D$, and are preferably chosen from the following table:

|  | $\alpha$ | $\beta$ |
|---|---|---|
| Cosine transform | 2 | $\frac{1}{5.5}$ |
| Wavelet transform | 1 | $\frac{1}{6.5}$ |

The damping factor k can also be determined experimentally. Conventionally, k can be chosen in the range [1;6].

As in the case of open loop regulation, a more efficient way to compute PQ if ASIC implementation is envisaged is to construct the histogram H of the moduli of the coefficients $I_{D_{min}} \leq I_D \leq I_{D_{min}}$, and PQ related to the bit rate $R_C$ is obtained as soon as $$\sum_{i=\frac{PQ}{\alpha}}^{I_{D_{max}}} H(i)$$

becomes equal to $\lfloor R_c \cdot \beta \rfloor$.

5) Quality Regulation

As previously stated, the system of the invention can also be used to regulate quality. In this case, the set point information $I_C$ is a set point quality denoted $Q_c$ hereinafter and the objective for the regulation system R is to provide, for each area of coefficients, the quantizing parameter PQ enabling this set point quality to be achieved.

In one particular embodiment the quantizing step PQ can be determined by an equation similar to that stated for bit rate regulation: $PQ = \alpha |I_D(\beta \cdot R_O)|$, in which $\alpha$ and $\beta$ are two parameters which are preferably in the following ranges: $\alpha \in [1;2]$ and $$\beta \in \left[\frac{1}{10}; \frac{1}{3}\right].$$

In the above equation, $R_O$ is the bit rate to be achieved to obtain the set point quality $Q_c$.

The value of the bit rate $R_O$ is obtained from the set point quality $Q_c$ by applying the equation:

$$\xi - 10 \cdot \text{Log}_{10}\left(\sum_{k=\lfloor\beta \cdot R_0\rfloor+1}^{Z} |I_D(k)|^2\right) = Q_c$$

in which $\xi$ depends on the nature of the quality set point.

For example, if the quality set point $Q_c$ is a Peak Signal to Noise Ratio (PSNR), then $\xi$ is given by the following equation:

$$\xi = 10\text{Log}_{10}\frac{Z(2^A-1)^2}{\chi}$$

If $Q_c$ is a Signal to Noise Ratio (SNR), then $\xi$ can be given by one of the following equations:

$$\xi = 10 \cdot \text{Log}_{10}\frac{V}{\chi} \text{ or } \xi = 10 \cdot \text{Log}_{10}\frac{E}{\chi}$$

in which V is the variance of the image or of the processed area of the image and E is its energy. A is the number of bits on which the input data is coded and Z is the cardinal number of the image area or of the processed image. Finally, $\chi$ is a parameter, preferably such that $$\frac{1}{2} \leq \chi \leq 3.$$

The energy E of an image I including L lines and C columns, and thus $Z=L\times C$ points, can be defined by the equation $$E = \frac{1}{Z}\sum_{i=0}^{C-1}\sum_{j=0}^{L-1}I(i,j)^2,$$

in which $I(i,j)$ represents the value of the point with coordinates i, j.

Similarly, the variance V of the image I can be defined by the equation $$V = \frac{Z}{1-Z}\bar{I}^2 + \frac{1}{Z-1}\sum_{i=0}^{C-1}\sum_{j=0}^{L-1}I(i,j)^2,$$

in which $\bar{I}$ is the average of the image.

The values of the parameters $\alpha$, $\beta$ and $\chi$ depend on the decorrelation process used by the decorrelation system $C_D$. These values are preferably chosen from the following table:

|  | $\alpha$ | $\beta$ | $\chi$ |
|---|---|---|---|
| Cosine transform | 2 | $\frac{1}{5.5}$ | $1+\frac{1}{2}$ |
| Wavelet transform | 1 | $\frac{1}{6.5}$ | $1+\frac{1}{12}$ |

There is claimed:

1. A processor system for transmitting digital image data in a transmission channel, said system comprising:
    a compression system for compressing said data including:
        a decorrelating system;
        a quantizing system;
        a coding system, and
    a regulation system supplying to said quantizing system at least one quantizing parameter wherein said regulation system receives as input decorrelated data from said decorrelation system and a set point, wherein said decorrelated data is organized into areas and within each area said regulation system sorts said decorrelated data beforehand in decreasing order of its absolute amplitude, wherein said at least one quantizing parameter is a quantizing step determined by the expression $PQ=\alpha \cdot |I_D(\beta \cdot R_C)|$, for each of said areas, $\alpha$ and $\beta$ being positive parameters.

2. The system claimed in claim 1, wherein said decorrelation system employs a discrete cosine transform and in that the value of $\alpha$ is approximately 2 and the value of $\beta$ is approximately $\frac{1}{5.5}$.

3. The system claimed in claim 1, wherein said decorrelation system uses a wavelet transform and the value of a is approximately 1 and the value of $\beta$ is approximately $\frac{1}{6.5}$.

4. A processor system for transmitting digital image data in a transmission channel, said system comprising:
    a compression system for compressing said data including:
        a decorrelating system;
        a quantizing system;
        a coding system, and
    a regulation system supplying to said quantizing system at least one quantizing parameter, wherein said regulation system receives as input decorrelated data from said decorrelation system and a set point, wherein said regulation system constructs a histogram from said decorrelated data and said at least one quantizing parameter is a quantizing step determined by the expression $$\sum_{i=\frac{PQ}{\alpha}}^{I_{D_{max}}} H(i) = \lfloor R_C \cdot \beta \rfloor.$$

5. A processor system for transmitting digital image data in a transmission channel, said system comprising:
    a compression system for compressing said data including:
        a decorrelating system;
        a quantizing system;
        a coding system, and
    a regulation system supplying to said quantizing system at least one quantizing parameter, wherein said regulation system receives as input decorrelated data from said decorrelation system and a set point, wherein said decorrelated data is organized into areas and within each area said regulation system sorts said decorrelated data beforehand in decreasing order of its absolute amplitude, and wherein said at least one quantizing parameter is a quantizing step determined by the expression $$PQ = \alpha \cdot \left| I_D \left( \beta \cdot \left( R_C + \frac{I_M}{k \cdot Z} \right) \right) \right|$$

for each of said areas, α, β, and k being positive parameters, Z the cardinal number of the set of said decorrelated data over said area and measured information is the difference between the level of filling of a storage means and a nominal level.

6. The system claimed in claim 5, wherein said storage means is at an output of said compression system.

7. The system claimed in claim 5, wherein said set point is a set point bit rate.

8. A processor system for transmitting digital image data in a transmission channel, said system comprising:
  a compression system for compressing said data including:
    a decorrelating system;
    a quantizing system;
    a coding system, and
  a regulation system supplying to said quantizing system at least one quantizing parameter, wherein said regulation system receives as input decorrelated data from said decorrelation system and a set point, wherein said set point is a signal quality set point.

9. The system claimed in claim 8, wherein said at least one quantizing parameter is a quantizing step determined by the expression PQ=α·|$I_D$(β·$R_O$)|, for each of said areas, in which $R_O$ is a bit rate to be achieved to obtain said signal quality set point and α and β are positive parameters.

10. A processing method for transmitting digital data, in particular image data, in a transmission channel, said method including the following ordered steps:
  decorrelating said data,
  computing a quantizing parameter from a set point and the decorrelated data,
  quantizing said decorrelated data in accordance with said quantizing parameter, and
  coding the data quantized in the preceding step, wherein said decorrelated data is organized into areas and within each area said computation step includes a preliminary step of sorting said decorrelated data in decreasing order of its absolute amplitude and wherein said quantizing parameter is a quantizing step determined by the expression PQ=α·|$I_D$(β·$R_C$| for each of said areas, α and β being positive parameters.

11. The method claimed in claim 10, wherein said decorrelation step uses a discrete cosine transform and the value of α is approximately 2 and the value of β is approximately $\frac{1}{5.5}$.

12. The method claimed in claim 10, wherein said decorrelation step uses a wavelet transform and the value of α is approximately 1 and the value of β is approximately $\frac{1}{6.5}$.

13. A processing method for transmitting digital data in a transmission channel, said method including the following ordered steps:
  decorrelating said data,
  computing a quantizing parameter from a set point and the decorrelated data,
  quantizing said decorrelated data in accordance with said quantizing parameter, and
  coding the data quantized in the preceding step, wherein said method further comprises constructing a histogram from said decorrelated data and said quantizing parameter is a quantizing step determined by the expression $$\sum_{i=\frac{PQ}{\alpha}}^{I_{D_{\max}}} H(i) \geq \lfloor R_C \cdot \beta \rfloor.$$

14. A processing method for transmitting digital data, in particular image data, in a transmission channel, said method including the following ordered steps:
  decorrelating said data,
  computing a quantizing parameter from a set point and the decorrelated data,
  quantizing said decorrelated data in accordance with said quantizing parameter, and
  coding the data quantized in the preceding step, wherein said decorrelated data is organized into areas and within each area said computation step includes a preliminary step of sorting said decorrelated data in decreasing order of its absolute amplitude and wherein said quantizing parameter is a quantizing step determined by the expression $$PQ = \alpha \cdot \left| I_D \left( \beta \cdot \left( R_C + \frac{I_M}{k \cdot Z} \right) \right) \right|$$

for each of said areas, α, β and k being positive parameters, Z the cardinal number of the set of said decorrelated data over said area and measured information is the difference between the level of filling of a storage means and a nominal level.

15. The method claimed in claim 14, further including a step of storing data at the output of the coding step in said storage means.

16. The method claimed in claim 14, wherein said set point is a set point bit rate.

17. A processing method for transmitting digital data in a transmission channel, said method including the following ordered steps:
  decorrelating said data,
  computing a quantizing parameter from a set point and the decorrelated data,
  quantizing said decorrelated data in accordance with said quantizing parameter, and
  coding the data quantized in the preceding step, wherein said set point is a signal quality set point.

18. The method claimed in claim 17, wherein said quantizing parameter is a quantizing step determined by the expression PQ=α·|$I_D$(β·$R_O$)| for each of said areas, in which $R_O$ is a bit rate to be achieved to obtain said signal quality set point and α and β are positive parameters.

* * * * *